United States Patent
Vaxelaire

(10) Patent No.: US 7,793,946 B2
(45) Date of Patent: Sep. 14, 2010

(54) VEHICLE SUSPENSION DEVICE

(75) Inventor: Alain Vaxelaire, Romagnat (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 185 days.

(21) Appl. No.: 11/992,794

(22) PCT Filed: Sep. 28, 2006

(86) PCT No.: PCT/EP2006/066822

§ 371 (c)(1),
(2), (4) Date: Mar. 28, 2008

(87) PCT Pub. No.: WO2007/036547

PCT Pub. Date: Apr. 5, 2007

(65) Prior Publication Data

US 2009/0267312 A1    Oct. 29, 2009

(30) Foreign Application Priority Data

Sep. 28, 2005    (FR) .................................. 05 10061

(51) Int. Cl.
*B60G 3/26* (2006.01)

(52) U.S. Cl. .............................. 280/5.521; 280/86.751; 280/86.757

(58) Field of Classification Search ............ 280/86.751, 280/86.757, 5.521, 5.52
See application file for complete search history.

(56) References Cited

U.S. PATENT DOCUMENTS

| 5,284,353 | A | 2/1994 | Shinji et al. |
| 6,267,387 | B1 * | 7/2001 | Weiss ......................... 280/5.52 |
| 6,293,561 | B1 * | 9/2001 | Goetzen et al. ............. 280/5.52 |
| 7,222,863 | B2 * | 5/2007 | Deal et al. ................ 280/5.521 |

FOREIGN PATENT DOCUMENTS

| EP | 000506141 A1 * | 9/1992 |
| FR | 2 813 240 | 3/2002 |
| FR | 2813240 | * 3/2002 |

* cited by examiner

*Primary Examiner*—Eric Culbreth
(74) *Attorney, Agent, or Firm*—Cohen Pontani Lieberman & Pavane LLP

(57) ABSTRACT

A suspension device (1) for suspending a wheel (2) with respect to the body (8) of a vehicle. The device allows a substantially vertical suspension movement and allows the wheel carrier (3) to move in terms of camber with respect to the body of the vehicle. The device comprises a slide (5) and a lower arm. The slide comprises an upper part (52) and a lower part (51) which can move one with respect to the other, the upper part being connected to the body and the lower part being connected to the wheel carrier. The device further comprises a rocker (4) articulated in the camber plane, on the one hand, to the lower arm and, on the other hand, via a link (7) to the wheel carrier, the rocker further being articulated in the camber plane to the lower part of the slide.

10 Claims, 11 Drawing Sheets

VEHICLE SUSPENSION DEVICE

RELATED APPLICATION

This is a U.S. National Phase Application under 35 USC 371 of International Application PCT/EP2006/066822, filed on Sep. 28, 2006.

this application claims the priority of French patent application no. 05/10061 filed Sep. 28, 2005.

FIELD OF THE INVENTION

The present invention relates to the ground-contact system of motor vehicles, particularly to suspension and wheel-support devices that give the wheel a degree of freedom in terms of camber with respect to the suspension elements.

The invention relates more specifically to the suspension of passenger cars and cars used in motor sports.

BACKGROUND OF THE INVENTION

Suspension devices have two main functions which have to be performed simultaneously at all times during operation. One of these functions is that of suspending the vehicle, that is to say of allowing each wheel substantially vertical oscillations. The other function of these devices is to guide the wheel, that is to say to control the angular position of the wheel plane.

The "wheel plane" is the name given to the plane, associated with the wheel, which is perpendicular to the axis of the wheel and which passes through the centre of the area of static contact with the ground when the wheel is vertical. The wheel plane thus defined is therefore firmly tied to the wheel axis and its orientation varies with that of the wheel.

The angular position of the wheel plane with respect to the body of the vehicle is defined by two angles: the camber angle and the steering angle. The camber angle of a wheel is the angle which, in a transverse plane perpendicular to the ground, separates the wheel plane from the mid-plane of the vehicle.

The steering angle of a wheel is the angle which, in a horizontal plane parallel to the ground, separates the wheel plane from the mid-plane of the vehicle.

The camber plane can be defined as the plane orthogonal to the ground, transverse to the vehicle and which passes through the centre of the area of contact of the wheel with the ground. This is the plane in which the camber movement takes place.

Patent application EP 1070609 describes a suspension device that allows the wheel a degree of freedom in terms of camber that is substantially independent of the suspension movements. The suspension movements are permitted by means of a multiple-link or double-wishbone system. The variations in camber are brought about by movements of the points of articulation of the link arms with respect to the body of the vehicle.

International application WO 01/72572 describes a suspension device in which it is the wheel support that gives the wheel a degree of freedom in terms of camber with respect to the suspension elements. This degree of freedom is controlled either actively, for example by an actuator on the basis of vehicle driving parameters, or passively through the forces exerted on the wheel in the contact area.

International application WO 04/058521 describes another wheel support device allowing the wheel a degree of freedom in terms of camber with respect to the suspension elements. The camber means comprise a triple hinge connected, on the one hand, to the wheel carrier and, on the other hand, to the suspension elements, the said triple hinge comprising two cheeks and two levers, each of the levers being secured to a respective one of the two cheeks, the levers being connected, on the one hand, to the wheel carrier and, on the other hand, to the suspension elements.

In the support and suspension devices described in the abovementioned patent applications there has been added, with respect to conventional suspension devices, a degree of freedom so as to allow the wheel some camber movement with respect to the body. This additional mobility may be afforded in various different ways but it is always the case that increasing the number of parts and the number of ball or pivot joints has a tendency to downgrade the rigidity and/or the robustness of the system as a whole. These systems are also relatively costly. What is more, the volume occupied by the suspension systems in motor vehicles is constantly being reevaluated in order to make more space for the passenger compartment or the wheels.

SUMMARY OF THE INVENTION

It is one objective of the invention to propose a suspension device which is able to alleviate at least some of the aforementioned disadvantages.

This objective is achieved by a suspension device for suspending a wheel with respect to the body of a vehicle, the said device allowing a substantially vertical suspension movement and allowing the wheel carrier to move in terms of camber with respect to the body of the vehicle, the device comprising a slide and a lower arm, the slide comprising an upper part and a lower part which can move one with respect to the other, the upper part being connected to the body and the lower part being connected to the wheel carrier, the device further comprising a rocker articulated in the camber plane, on the one hand, to the lower arm and, on the other hand, via a link to the wheel carrier, the rocker further being articulated in the camber plane to the lower part of the slide.

As a preference, the link is articulated to the rocker and to the wheel carrier via respective pivot joints. Again as a preference, the lower part of the slide is articulated to the wheel carrier via a ball joint. In this case, the lower part of the slide is preferably articulated to the rocker via a ball joint, a stay limiting the rotation of the lower part of the slide.

Alternatively, the lower part of the slide may be articulated to the rocker via a pivot joint.

As a preference, the lower arm is a wishbone, the rocker being articulated to the wishbone via a ball joint, the device further comprising a steering rod acting directly on the rocker.

As a preference, the suspension spring acts within the slide.

The invention also relates to a vehicle axle comprising, for each wheel of the axle, a suspension device according to the invention.

As a preference, the axle further comprises camber connecting means that make the camber of each wheel dependent on the camber of the other wheel of that axle.

As a preference, the camber connecting means further perform the anti-roll function of the axle.

As a further preference, the anti-roll function is performed by a transverse anti-roll bar working in torsion, the camber connection being afforded by a transverse movement of the anti-roll bar with respect to the body.

The invention also relates to a motor vehicle comprising an axle according to the invention.

BRIEF DESCRIPTION OF THE DRAWINGS

The invention will be better understood by virtue of the description of the figures which respectively depict.

DETAILED DESCRIPTION OF THE DRAWINGS

Figure 1:
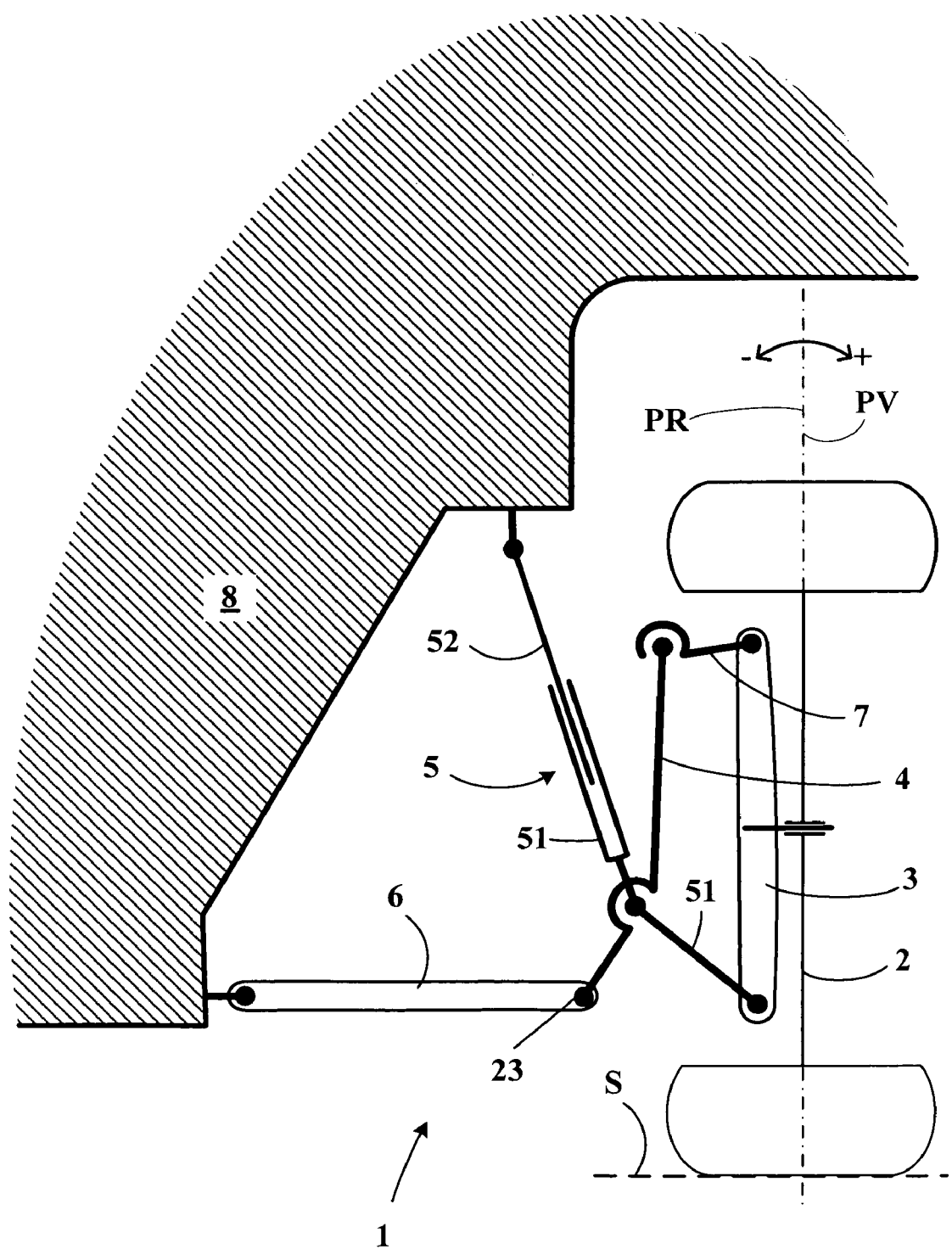
FIGS. 1 to 3: schematic views in a longitudinal direction of the suspension device of the invention in three different camber positions.

In the various figures, elements which are identical or similar bear the same reference numerals. They are not necessarily always described repeatedly.

FIG. 1 depicts a suspension device according to the invention. The device 1 comprises a slide 5 and a lower arm 6. The slide 5 comprises an upper part 52 connected to the body 8 and a lower part 51 connected to the wheel carrier 3. The vertical suspension movement of the wheel 2, that is to say the vertical movement of the wheel carrier 3 with respect to the body 8 of the vehicle is permitted by the relative movement of the two parts of the slide. The suspension system further comprises a rocker 4 articulated in the camber plane on the one hand to the lower arm 6 and, on the other hand, to the wheel carrier 3 via a link 7. The rocker 4 is also articulated in the camber plane to the lower part 51 of the slide. This Figure shows a zero camber angle (that is to say that the plane of the wheel PR corresponds to the vertical plane PV perpendicular to the ground S).

Figure 3:
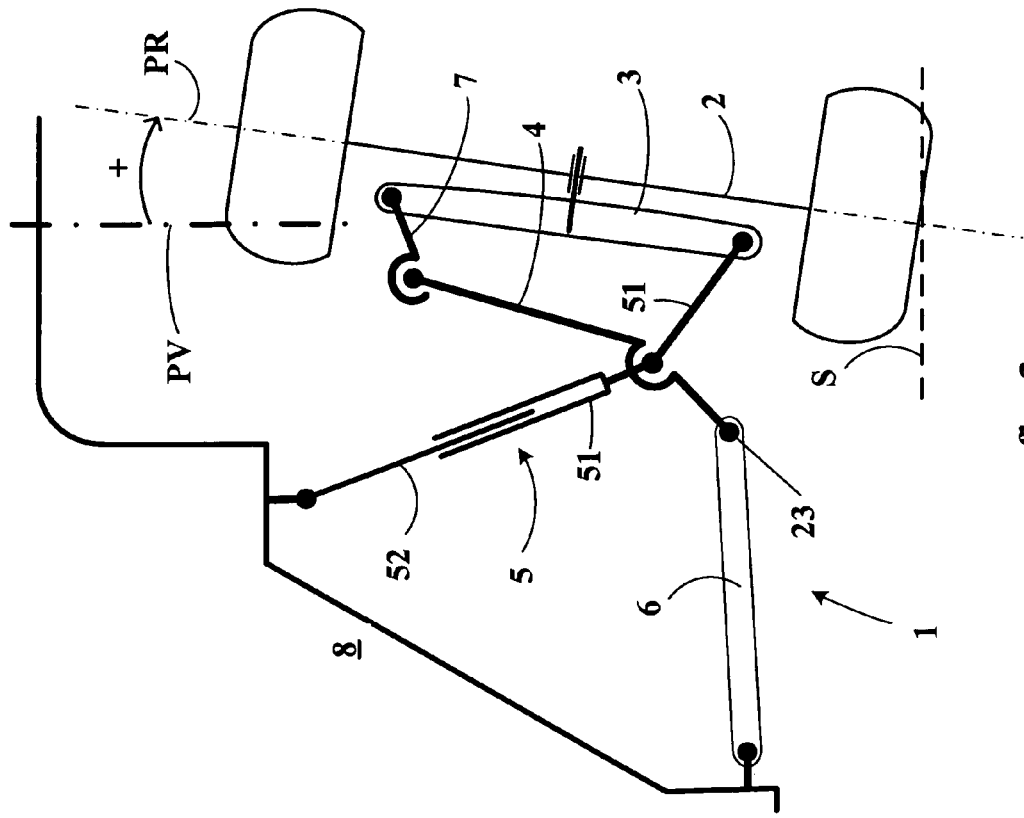
Figure 2:
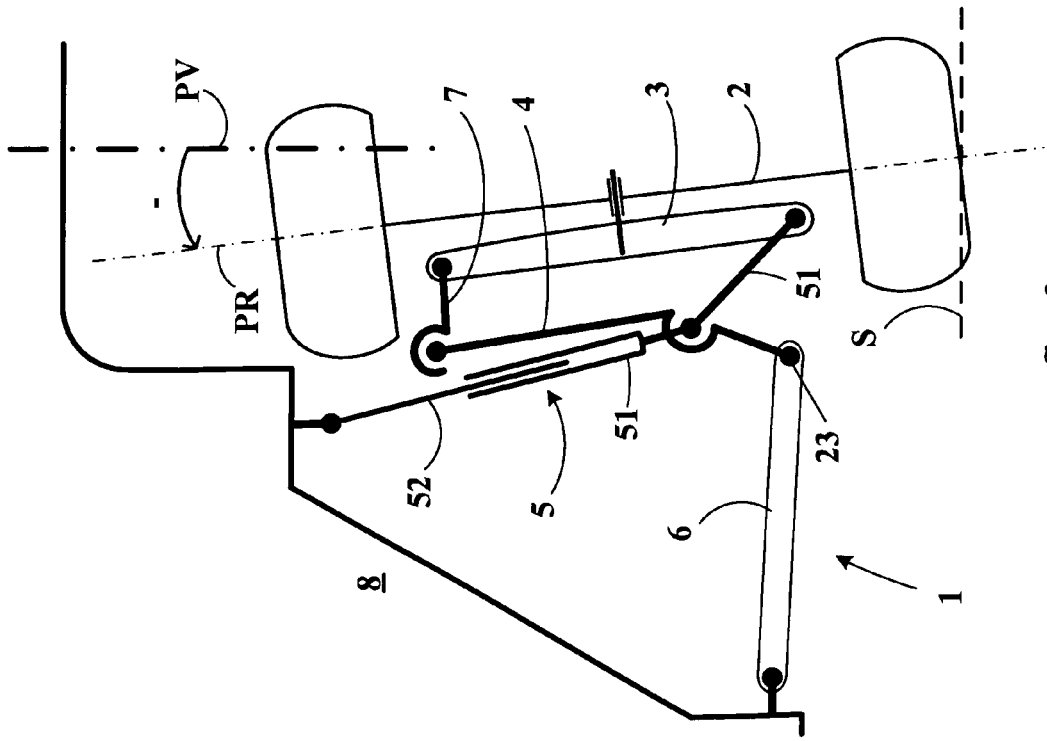

FIGS. 2 and 3 show the device of FIG. 1 in various camber positions. In FIG. 2, the wheel is inclined towards the inside of the vehicle (the camber angle is therefore negative). In FIG. 3, the wheel is inclined toward the outside of the vehicle (the camber angle is therefore positive). As can be clearly seen by comparing the figures, the camber movement of the wheel with respect to the body is connected with the oscillations of the rocker 4 with respect to the slide 5 and to the lower arm 6.

Figure 4:
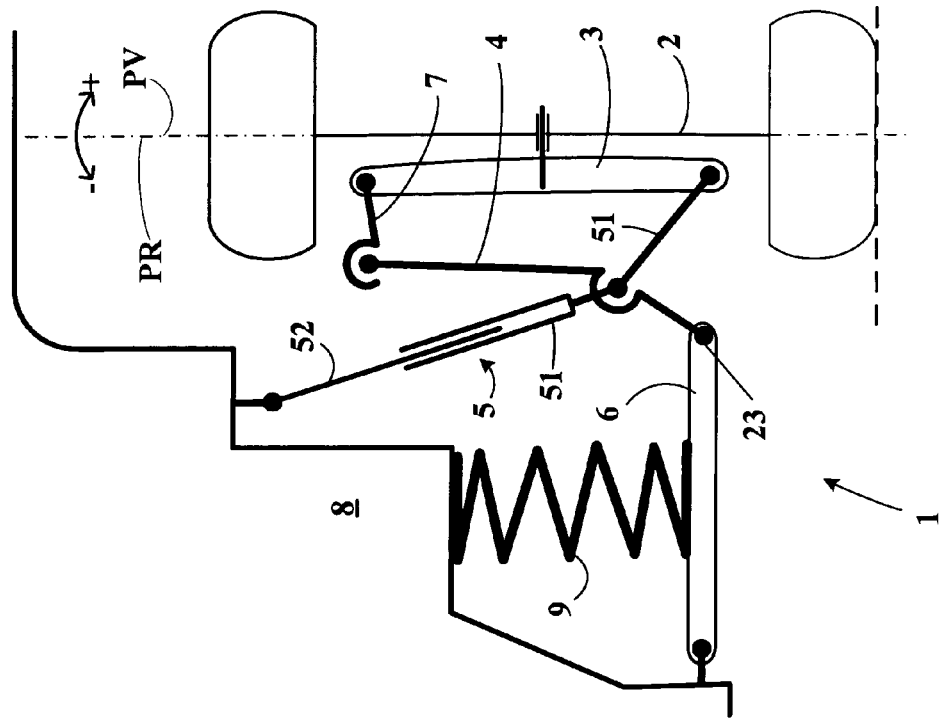
FIGS. 4 and 5: schematic views in a longitudinal direction of two different embodiments of the suspension device of the invention.
Figure 5:
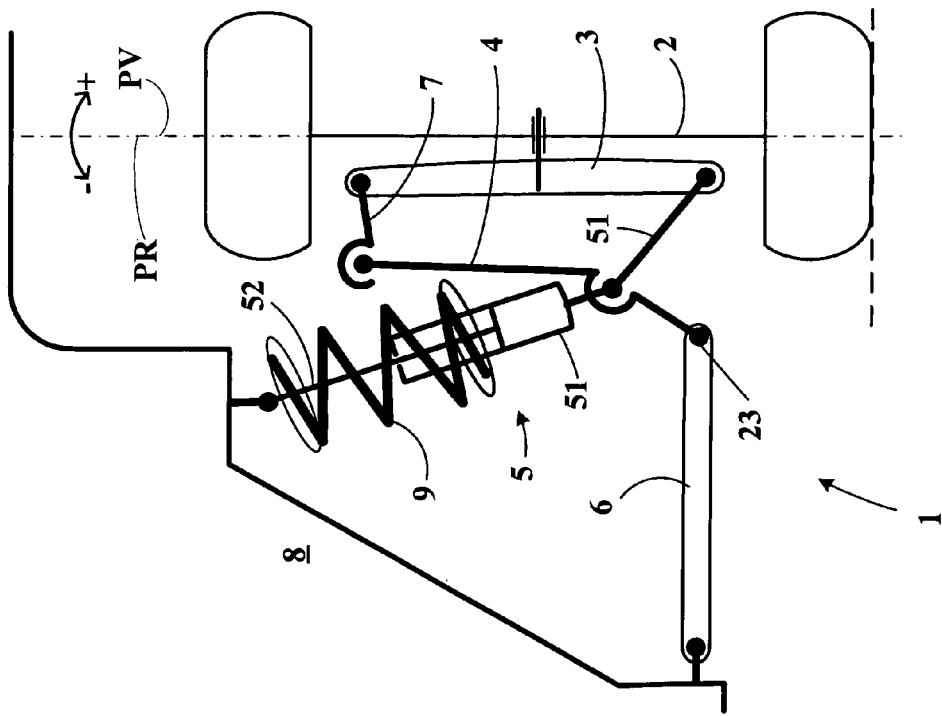

FIG. 4 schematically depicts the fact that the suspension spring 9 can be associated with the slide 5 and thus form a strut in a way known per se. Alternatively, as has been depicted in FIG. 5, the suspension spring 9 may be independent of the slide 5 and act, for example, directly between the body 8 and the lower arm 6.

FIGS. 6 to 9 depict in perspective and very schematically various examples of possible configurations of the suspension device according to the invention. To simplify the drawing, the assembly formed by the wheel 2 and the wheel carrier 3 is in particular depicted as a single rigid element resting on the ground.

These various examples of configurations have in common the fact that they use a wishbone-shaped lower arm 6 associated with a track rod or steering rod 61 and with a strut 5 combining the slide and the suspension spring 9.

Figure 6:
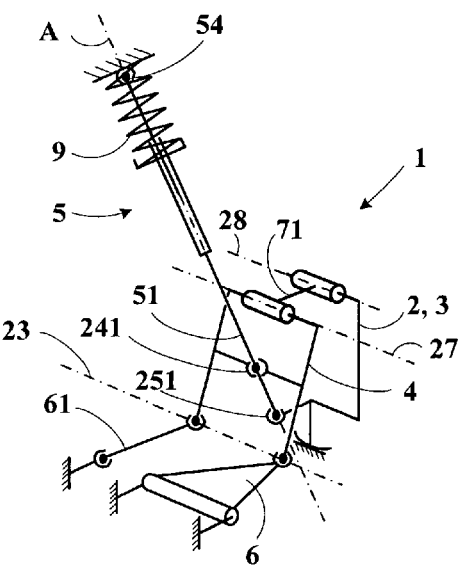
FIGS. 6 to 9: schematic perspective views of various embodiments of the device.

In the embodiment of FIG. 6, the lower part 51 of the slide comprises a first ball joint 241 connecting to the rocker 4 and a second ball joint 251 connecting to the wheel carrier 3. The link 71 has a first pivot joint about the axis 27 connecting to the rocker 4 and a second pivot joint about the axis 28 connecting to the wheel carrier 3. The axes 27 and 28 are preferably parallel and substantially horizontal. These two pivot joints allow the steering forces to be transmitted from the wheel carrier to the lower arm 6 and the link rod 61 via the link 71. The axis 23 is the axis about which the rocker 4 oscillates with respect to the lower arm 6 and with respect to the steering link rod 61.

As a preference, in this configuration, the upper point 54 of attachment of the slide to the body of the vehicle is aligned with the ball joints 241 and 251 and with the axis A of the slide. This geometric condition makes it possible to ensure that the camber movements and the suspension movements remain independent of the rotation of the strut.

Figure 7:
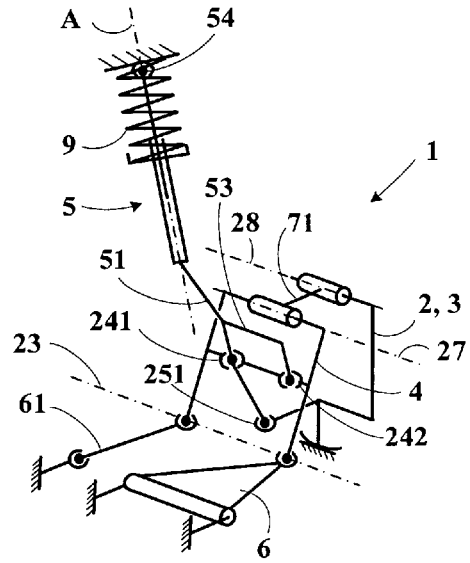

As an alternative, if this geometric condition is not satisfied, the lower part 51 of the strut may comprise a torsion stay 53 capable of limiting the said rotation (and therefore the effects thereof). This alternative is depicted in FIG. 7. The stay 53 can rest on the rocker 4 via an appropriate connection. Although a ball joint 242 has been depicted here, a simply-supported connection will suffice and prevent any static redundancy. The stiffness of this connection may be very much lower than that of the ball joint 241. The stay 53 may be rigidly connected to the slide as illustrated here but may equally well be articulated to the slide, provided that this stay is able to limit the rotation of the slide.

Figure 8:
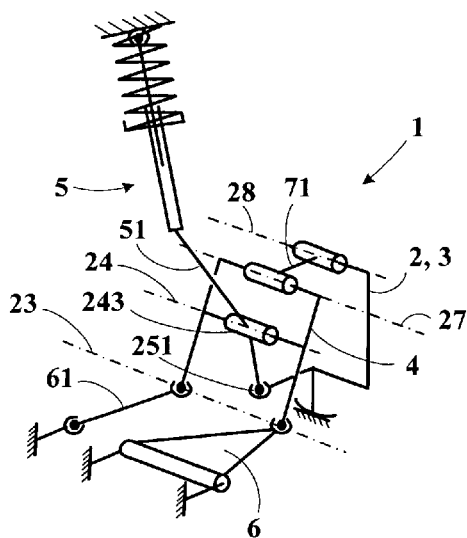

FIG. 8 depicts an alternative embodiment to the one of FIG. 7. The difference is concerned precisely with how the strut (that is to say its lower part 51) is articulated to the rocker 4. This articulation here uses a pivot joint 243 operating about an axis 24. This pivot joint therefore checks the rotational movement of the slide in place of the stay 53 of FIG. 7. Because of its statically redundant nature, this configuration demands correct positioning of the pivot and ball joints. As a preference, the axes 23, 24, 27 and 28 are parallel and substantially horizontal.

Figure 9:
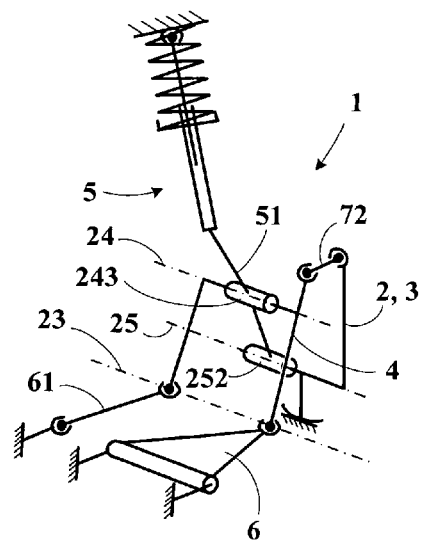

The configuration of FIG. 9 also uses a pivot joint 243 of axis 24 between the lower part 51 of the strut and the rocker 4 and also uses a pivot joint 252 of axis 25 between the strut and the wheel carrier 3. The link 72 may then be articulated between the rocker and the wheel carrier by simple spot connections (ball joints or their functional equivalent). In this configuration, the steering forces of the wheel are therefore transmitted from the wheel carrier 3 to the lower arm 6 and the link rod 61 via the lower part 51 of the slide. This is a difference by comparison with the configurations of FIGS. 6 to 8 in which it is the link 71 which performs this transmission. As a preference, in the configuration of FIG. 9, the axes 23, 24 and 25 are parallel and substantially horizontal.

Figure 10:
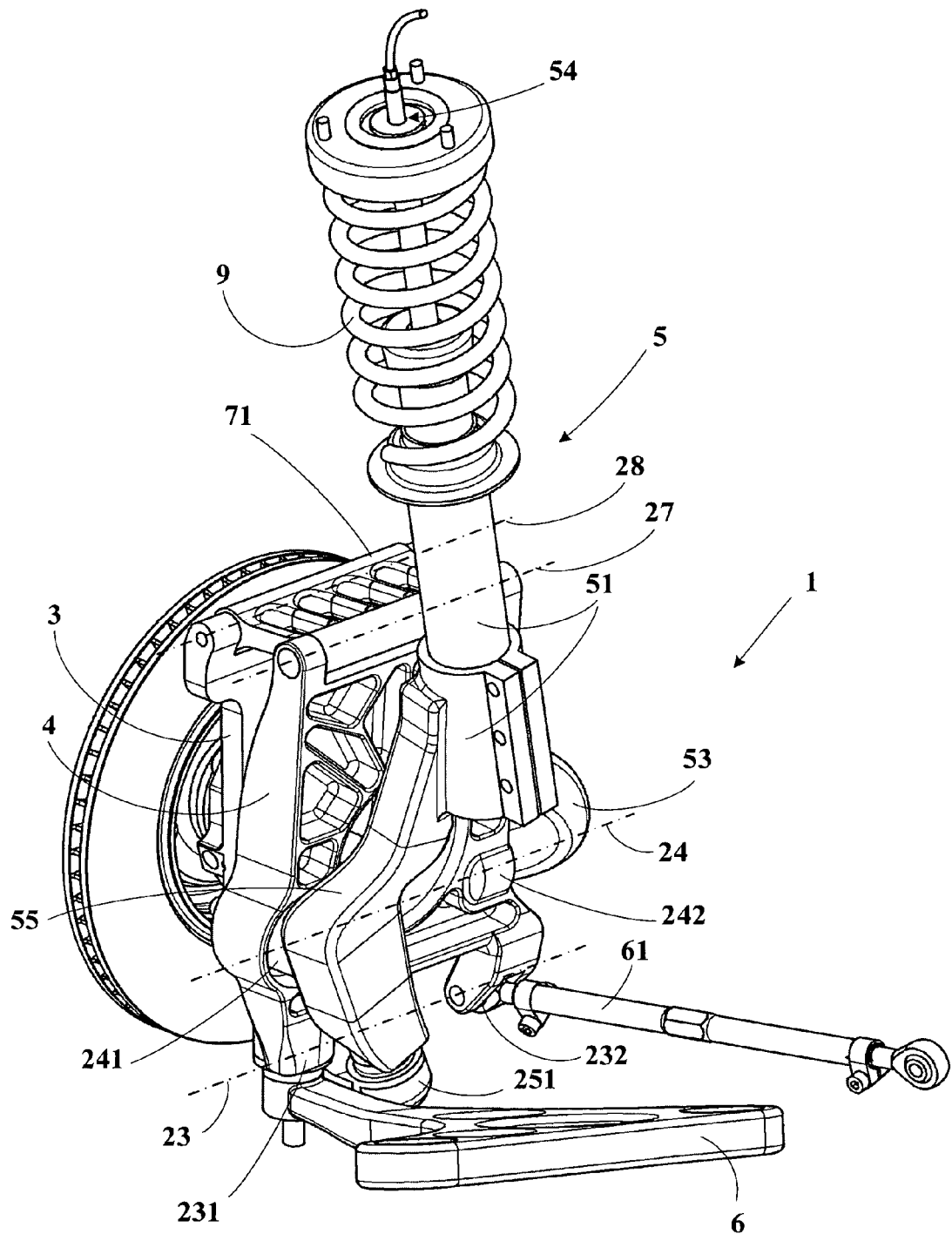
FIGS. 10 and 11: perspective views of a preferred embodiment of the device.
Figure 11:
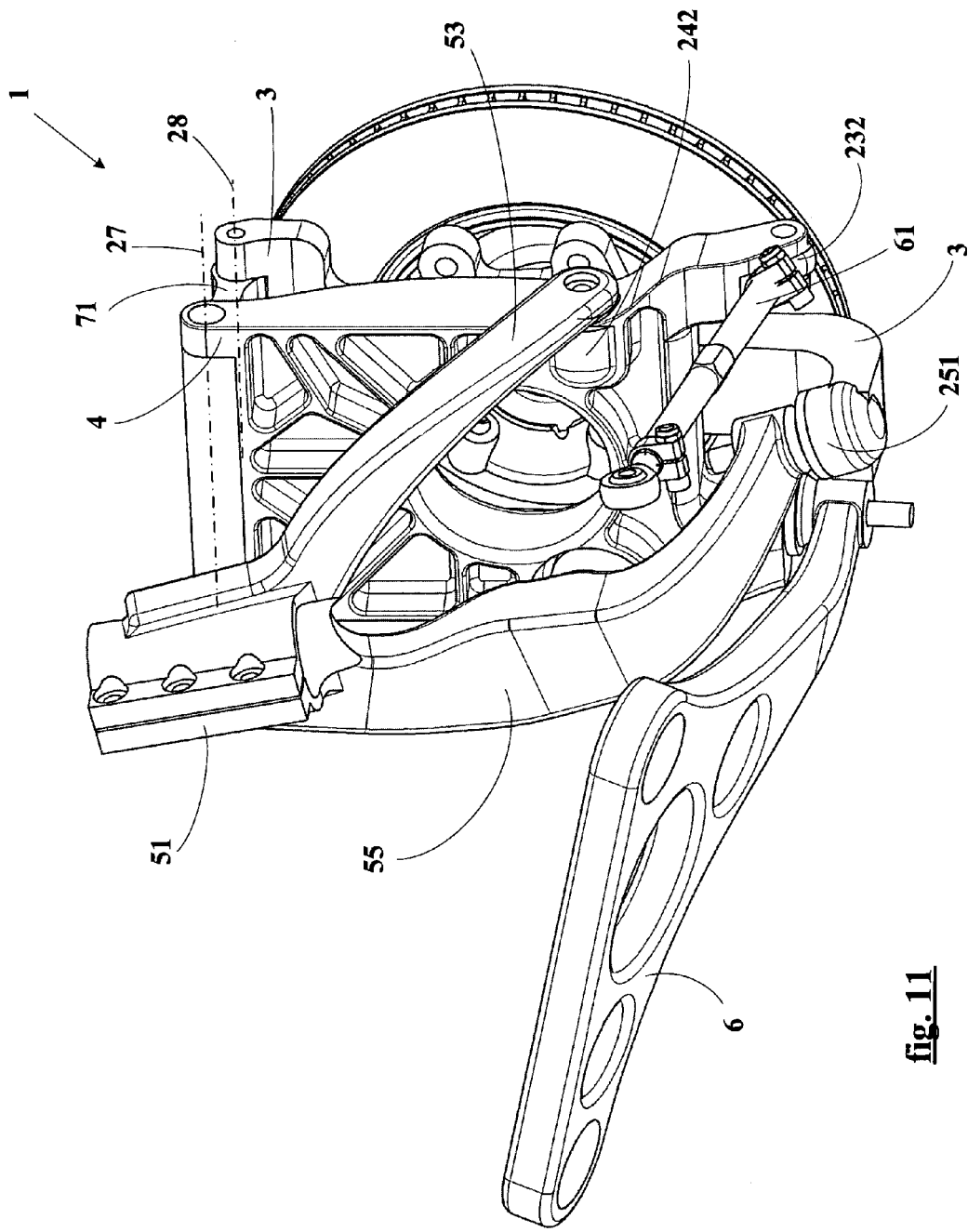
Figure 12:
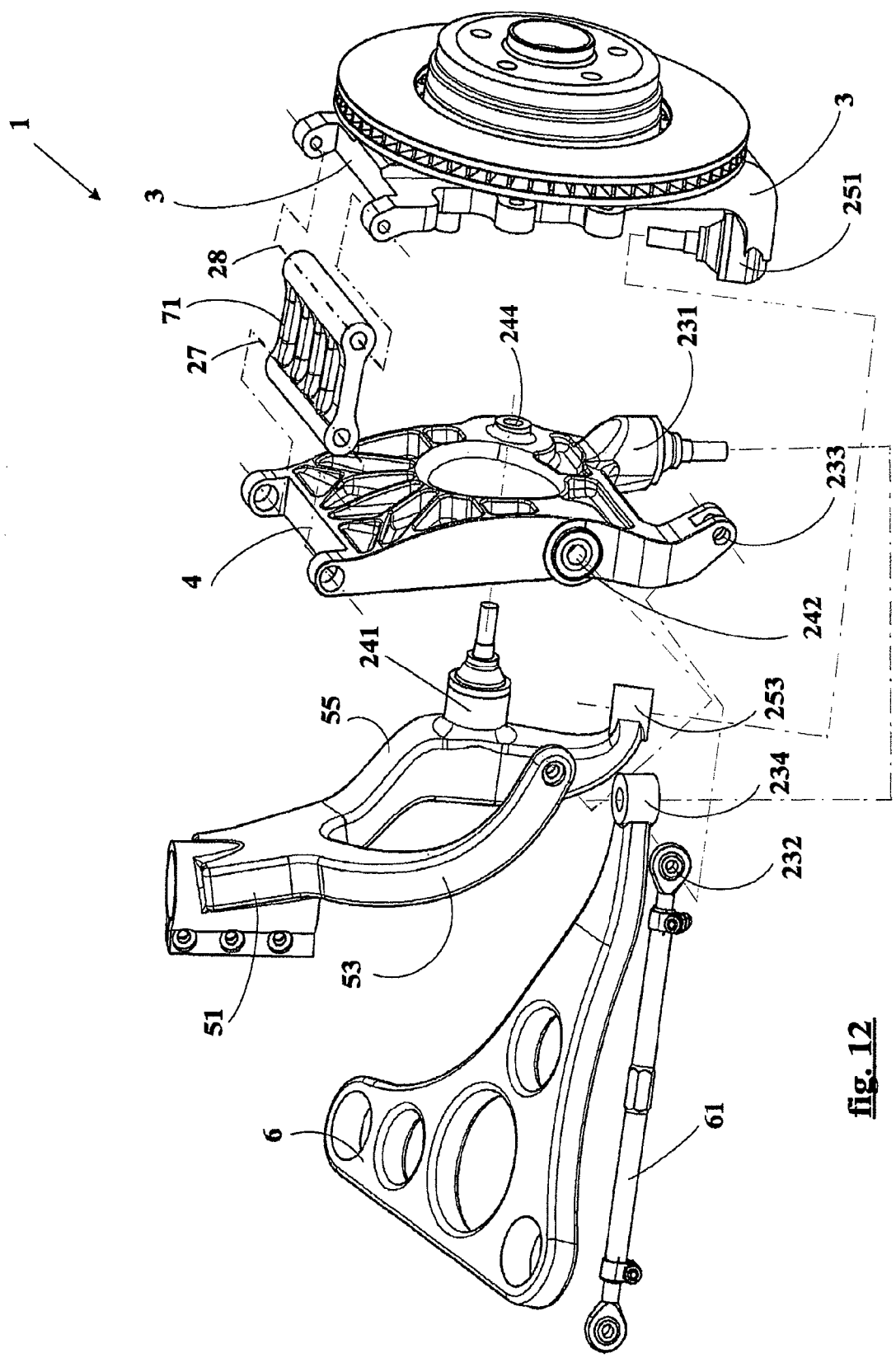
FIG. 12: an exploded and perspective view of the embodiment of FIGS. 10 and 11.

FIGS. 10 to 12 depict, in various views, one embodiment of the suspension device according to the invention. This embodiment corresponds more specifically to the principle described in FIG. 7; here it is specially suited to a driven and steered front wheel of a passenger car. In order to make the drawings easier to understand, the wheel has not been depicted but a person skilled in the art can rely on the position of the brake disc to appreciate how the various elements are disposed. The lower suspension arm in this instance is a wishbone 6 and the steering of the wheel is controlled by a steering rod 61 positioned forward of the wishbone.

These figures show the special shape of the strut 5 and especially of its lower part 51. The lower part 51 of the strut 5 comprises a horn 55 extending as far as its articulation (by means of a ball joint 251) to the wheel carrier 3. This horn is also articulated in its central part to the rocker 4 via a ball joint 241. The lower part 51 of the slide 5 comprises a stay 53 also connected to the rocker 4. The purpose of this stay is to check the rotation of the slide as described in FIG. 7. The lower part 51 comprises, in a way known per se, a yoked assembly with the spring-damper combination. In order to be able to make a comparison with the principles set out in FIGS. 1 to 4, let us note that the lower part 51 of the slide 5 here combines the horn 55, the stay 53 and the body of the damper. The upper part 52 essentially corresponds to the rod of the telescopic damper. These two parts are able to move one with respect to the other in order to afford the vehicle the degree of vertical suspension freedom. In addition, the steering of the wheel is accompanied by a rotation of the lower part 51 about the rod part of the strut.

The link 71 connects the rocker 4 to the wheel carrier 3 via axes 27 and 28 and thus transmits steering forces from the wheel carrier to the steering rod 61. The steering rod 61 is connected via a ball joint 232 to the rocker 4. The rocker is also connected to the lower wishbone 6 by a ball joint 231. The axis 23 is therefore defined by these two ball joints and this is the axis about which the rocker can oscillate with respect to the body.

It can also be clearly seen (particularly in FIG. 11) that this configuration allows a driveshaft to pass between the horn 55 and the stay 53 and through the middle of a recess made in the rocker 4.

FIG. 12 shows, in an exploded view, the essential elements of this embodiment in order to make this preferred configuration easier to understand. When the device is assembled, the ball joint 232 of the steering rod 61 is fixed into the yoke 233 of the rocker 4, the lower ball joint 251 of the wheel carrier 3 is fixed to the end 253 of the horn 55, the ball joint 241 of the horn 55 is fixed to the eye 244 of the rocker 4, the lower ball joint 231 of the rocker 4 is fixed to the end 234 of the lower arm 6, the stay 53 is connected to the rocker 4 via the joint 242 and the rod 71 is fixed by its axis 28 to the wheel carrier 3 and via its axis 27 to the rocker 4.

This exploded view in particular better shows the joint 242 which connects the stay 53 to the rocker 4. This joint is preferably an elastomeric and relatively compliant joint so that it allows small movements without generating significant forces. By contrast, the ball joints 241, 231 and 251 are preferably very rigid because they govern the accuracy with which the wheel is guided, particularly in terms of camber and in terms of steering angle. For the same reason, the pivots of the link 71 on the rocker 4 and on the wheel carrier 3 are preferably very rigid, for example produced using plain bearings or ball, needle or roller bearings.

FIGS. 13 to 18 depict particular examples of axles according to the invention. An axle according to the invention comprises, for each wheel, a suspension device (1 and 1') according to the invention. As a preference, the camber movements of the two wheels of the axle are also tied via camber connection means, for example such as those described in the published application WO 05/021294 or in the application filed under the number FR 04/06930.

Also as a preference, the camber connection is afforded via the translational movement of the anti-roll bar of the axle.

FIGS. 13 to 18 thus depict various embodiments of a preferred feature of the suspension devices according to the invention which consists in tying the camber movements of one wheel to those of the other wheel of the same axle through a transverse movement of the anti-roll bar.

FIGS. 13 to 18 show axles which, for each wheel of a front or rear axle assembly, readopt the configuration of FIG. 7. It should be pointed out that the front of the vehicle is to the right in the figures.

Figure 13:
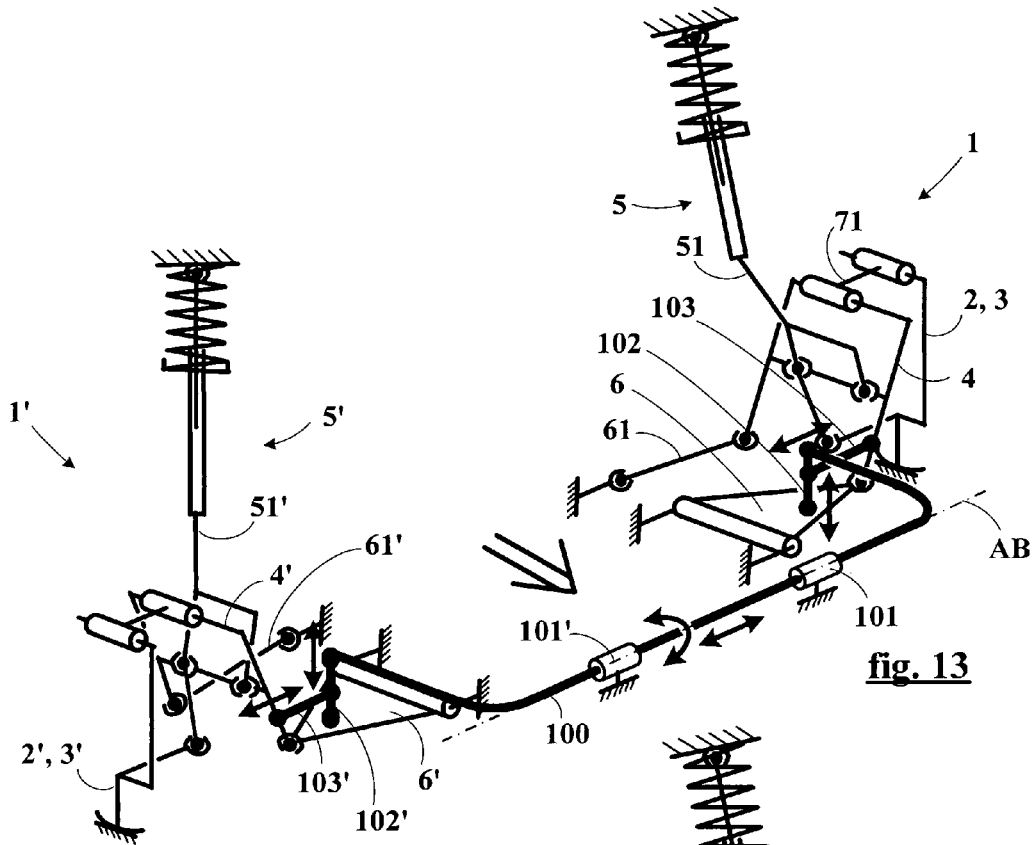
FIGS. 13 to 20: schematic perspective views of axles according to various preferred embodiments of the invention.

In FIG. 13, an anti-roll bar 100 connects the lower wishbones 6 and 6' so that some of the load can be transferred from one wheel to the other in the event of differing suspension travel as is known per se. To do that, the anti-roll bar 100 is guided in rotation and in translation along the axis AB with respect to the body by supports 101 and 101' and is connected to each wishbone by vertical tie rods 102 and 102'. According to a preferred feature of the invention, the anti-roll bar also performs a camber connection function. To do that, horizontal tie rods 103 and 103' connect the anti-roll bar to the two rockers 4 and 4'. The oscillations of the rockers in terms of camber cause a translational movement (along the axis AB) of the anti-roll bar thus making the camber oscillations dependent on one another. In this example, the pivot axis AB of the anti-roll bar is forward of the axle and the horizontal tie rods act on the vertical tie rods.

Figure 14:
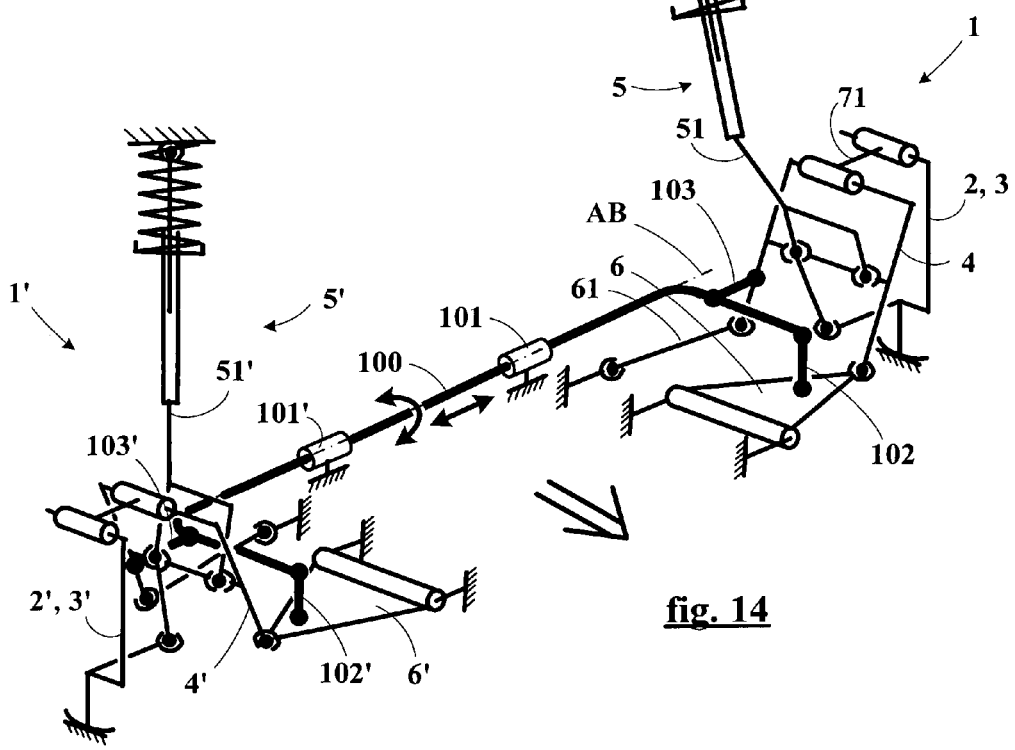

In FIG. 14, the anti-roll bar is behind the axle and the horizontal tie rods (103, 103') act directly on the bar, not far from its pivot axis AB.

Figure 15:
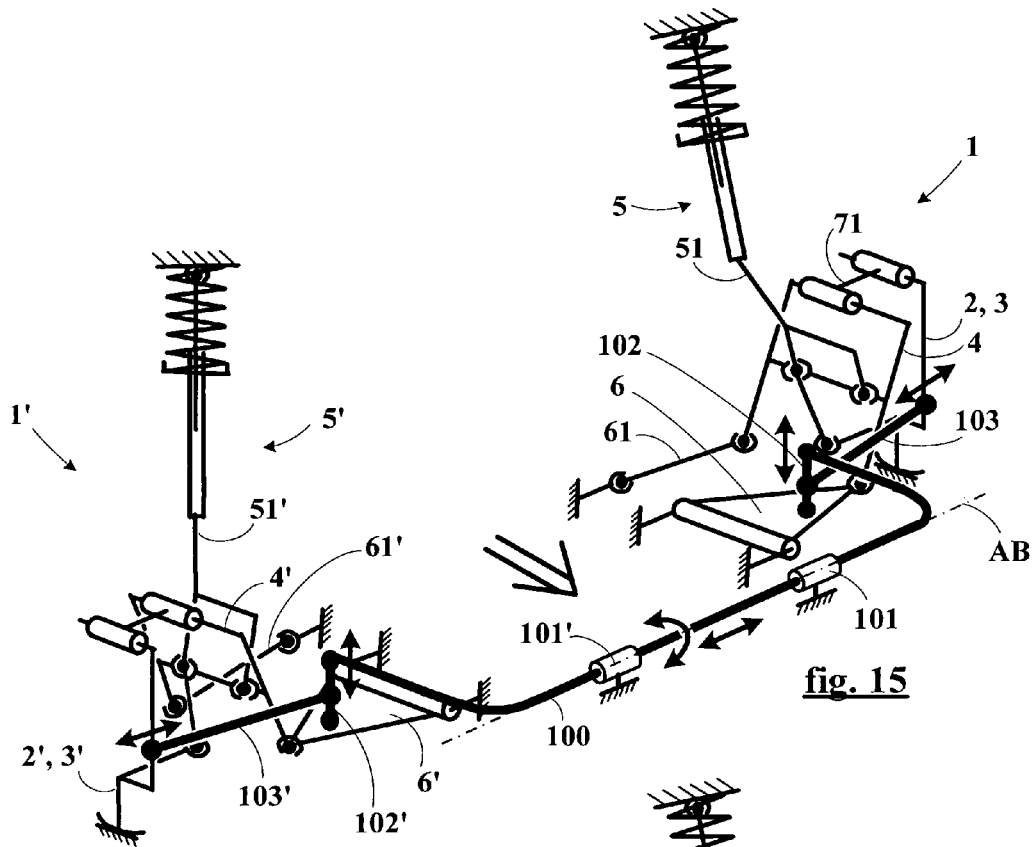

In FIG. 15, the anti-roll bar is forward of the axle and the horizontal tie rods (103, 103') are connected to the wheel carriers 3 and 3'. They act on the bar via the vertical tie rods (102, 102').

Figure 16:
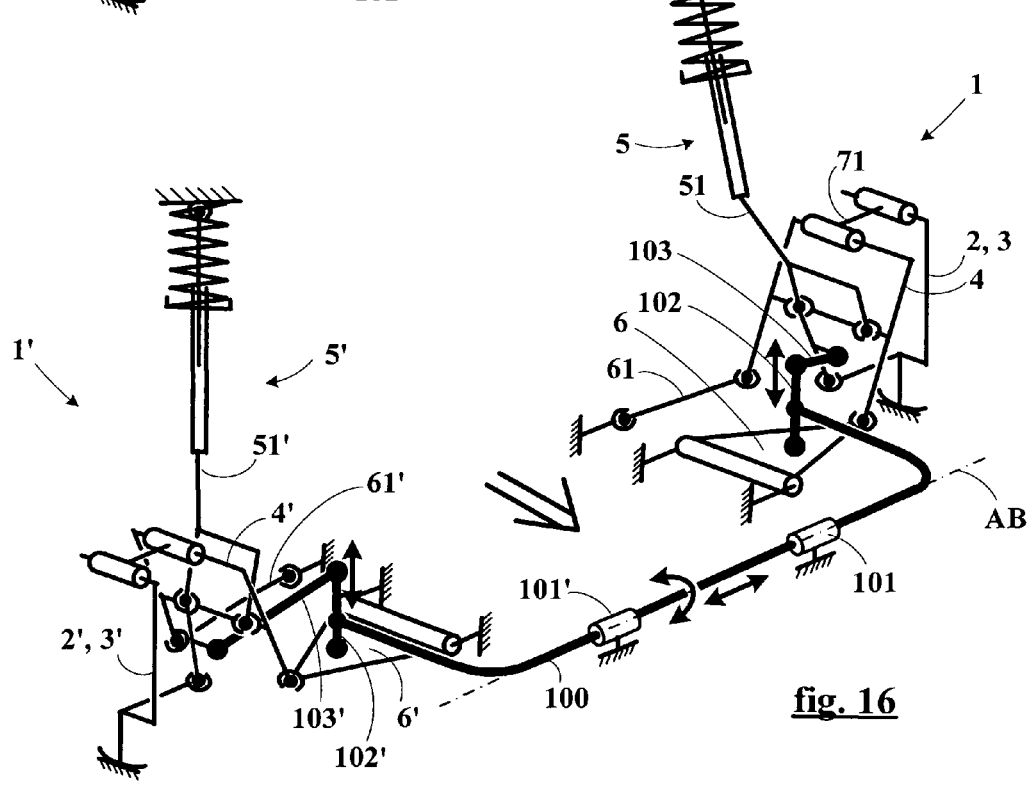

In FIG. 16, the horizontal tie rods (103, 103') are connected to the lower parts 51 and 51' of the slides. They act on the bar via the vertical tie rods (102, 102'), that is to say that they use them as a lever to amplify the forces transmitted to the bar and to reduce the transverse travel of the bar in its supports.

Figures 17, 18:
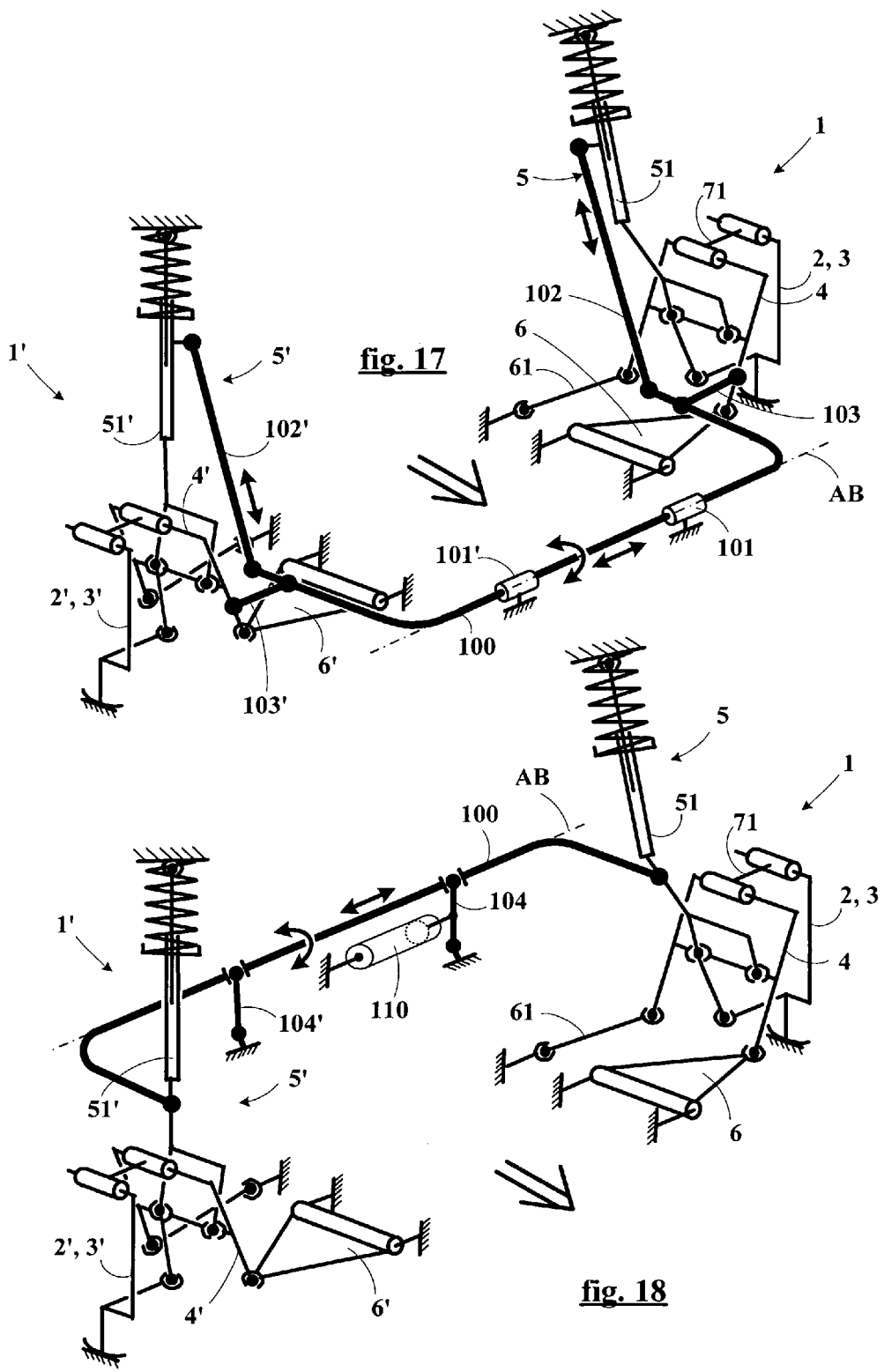

In FIG. 17, the horizontal tie rods (103, 103') are connected to the rockers 4 and 4'. They act directly on the bar. The vertical tie rods (102, 102') are connected to the lower part of the strut, for example to the body of the damper.

In FIG. 18, the anti-roll bar is behind the axle. It is directly connected to the lower parts 51 and 51' without either any vertical or any horizontal tie rod. The supports supporting the anti-roll bar with respect to the body also differ in that they use substantially vertical link rods 104 and 104'. FIG. 18 also depicts an actuator 110 able to influence the oscillatory movements of the link rod 104, that is to say the translational movement of the anti-roll bar 100 and therefore the camber movements of the wheels of the axle. This actuator may be an active actuator (for example controlled on the basis of vehicle driving parameters) or a simple passive damper.

FIGS. 13 to 18 illustrate a number of possible configurations of the camber connection afforded via the translational movement of the anti-roll bar, although numerous other configurations are conceivable.

This principle of camber connection can in fact be applied to any suspension device in which the camber angle of the wheels varies, for example such as those described in the patent applications published under the numbers WO 01/072572, EP 1247663, EP 1275534, WO 04/052666, WO 04/058521 or WO 05/021294 or in the applications filed under the numbers FR 04/06930, FR 04/07409 or FR 05/04271.

Figure 19:
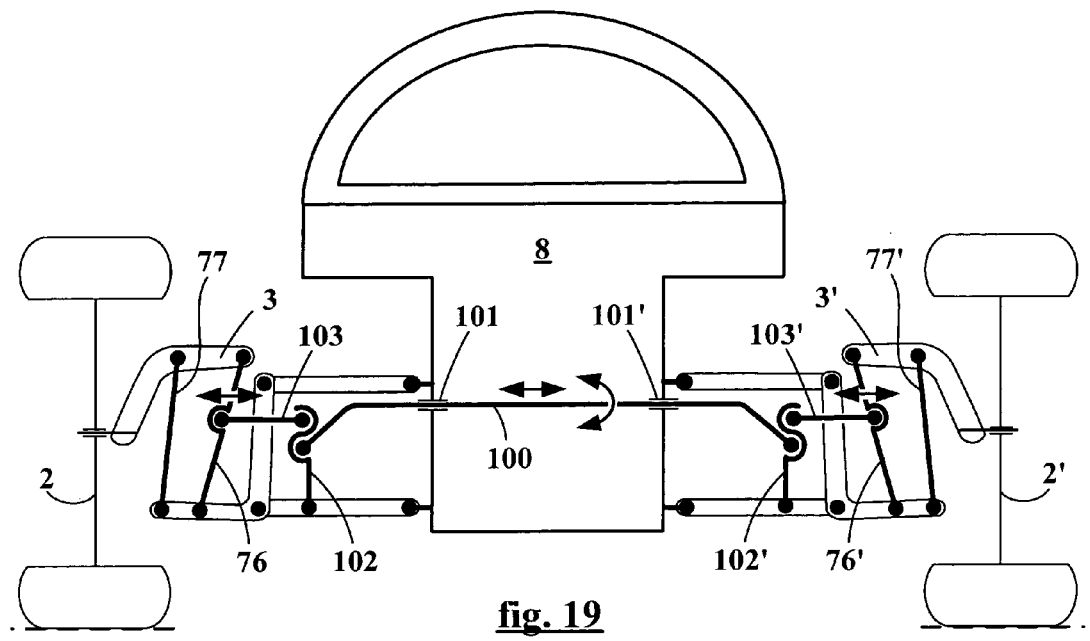

FIG. 19 shows the example of a camber connection afforded via the translational movement of the anti-roll bar in the case of a suspension device according to applications WO 01/072572, WO 04/058521, FR 04/06930 or FR 05/04271. Studying the left-hand portion of the drawing it can be seen that the anti-roll bar 100 is here connected via a vertical tie rod 102 to the lower arm and that a horizontal tie rod 103 connects the end of the vertical tie rod to one of the camber links (in this instance the inner link 76). Thus, the camber movements of the wheel 2 (the left-hand wheel in this figure) are tied to those of the opposite wheel 2' (the right-hand wheel in this figure) through the translational movement of the anti-roll bar 100 in the supports 101 and 101'.

Figure 20:
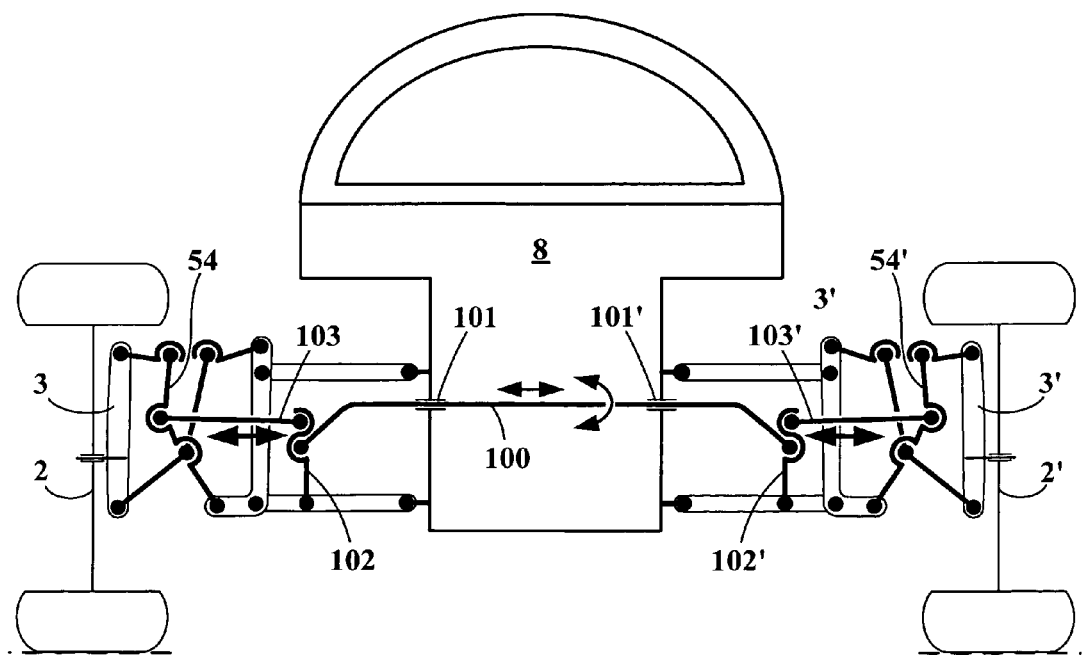

FIG. 20 shows the example of a camber connection afforded via the translational movement of the anti-roll bar in the case of a suspension device according to applications WO 04/052666, FR 04/07409 or FR 05/04271. Studying the left-hand part of the drawing it can be seen that the anti-roll bar 100 is here connected via a vertical tie rod 102 to the lower arm and that a horizontal tie rod 103 connects the end of the vertical tie rod to one of the camber levers (in this instance the lever 54). Thus, the camber movements of the wheel 2 (the left-hand wheel in this figure) are tied to those of the opposite wheel 2' (the right-hand wheel in this figure) through the translational movement of the anti-roll bar 100 in the supports 101 and 101'.

In the various embodiments a lower arm 6 in the form of a wishbone has been depicted. This wishbone may of course, in a way known per se, be replaced by two arms managed in the form of a triangle. Likewise, in the case of an unsteered wheel, the lower arm may of course adopt the shape of a trapezium and control the steering angle of the wheel unaided (that is to say without recourse to a track rod 61). The expression "lower arm" in this application therefore covers various options well known to those skilled in the art of suspension design.

Unless specified otherwise, the term "pivot" as used in this application is used with equal preference to denote a joint that allows both rotation about an axis and translational movement along this same axis (generally known as a "sliding pivot") and a joint which allows only rotation about the axis (generally known as a "non-sliding pivot"). The choice of the type of pivot may affect the transmission of forces but does not normally alter the kinematics of the device.

The invention claimed is:

1. A suspension device for suspending a wheel with respect to a body of a vehicle, the suspension device allowing a substantially vertical suspension movement and allowing a wheel carrier to move in terms of camber with respect to the body of the vehicle, the suspension device comprising:
    a slide comprising an upper part and a lower part which can move one with respect to the other, the upper part being connected to the body of the vehicle and the lower part being connected to the wheel carrier,
    a lower arm, and
    a rocker articulated in a camber plane, on the one hand, to the lower arm and, on the other hand, via a link to the wheel carrier, the rocker further being articulated in the camber plane to the lower part of the slide.

2. The suspension device according to claim 1, in which the link is articulated to the rocker and to the wheel carrier via respective pivot joints.

3. The suspension device according to claim 2, in which the lower part of the slide is articulated to the wheel carrier via a ball joint.

4. The suspension device according to claim 3, in which the lower part of the slide is articulated to the rocker via a ball joint, a stay limiting the rotation of the lower part of the slide.

5. The suspension device according to claim 2, in which the lower part of the slide is articulated to the rocker via a pivot joint.

6. The suspension device according to claim 1, in which the lower arm is a wishbone, the rocker being articulated to the wishbone via a ball joint, the suspension device further comprising a steering rod acting directly on the rocker.

7. The suspension device according to claim 1, further comprising a suspension spring acting within the slide.

8. A vehicle axle comprising, for each wheel of the axle, a suspension device according to claim 1.

9. The axle according to claim 8 further comprising camber connecting means that make the camber of each wheel dependent on the camber of another wheel of that axle.

10. The axle according to claim 9, the camber connecting means further performing an anti-roll function of the axle.

* * * * *